United States Patent [19]

Abels et al.

[11] Patent Number: 5,224,815

[45] Date of Patent: Jul. 6, 1993

[54] INDUSTRIAL TRUCK WITH A MONITORING APPARATUS FOR THE LOADING STATE

[75] Inventors: Theodor Abels, Aschaffenburg; Günter Honecker, Seligenstadt, both of Fed. Rep. of Germany

[73] Assignee: Linde Aktiengesellschaft, Wiesbaden, Fed. Rep. of Germany

[21] Appl. No.: 759,453

[22] Filed: Sep. 13, 1991

[30] Foreign Application Priority Data

Sep. 28, 1990 [DE] Fed. Rep. of Germany ....... 4030748

[51] Int. Cl.$^5$ ............................................... B66F 9/22
[52] U.S. Cl. ........................................ 414/635; 414/21; 414/673; 364/508; 340/815.01; 340/665; 177/25.12; 212/155; 187/9 R
[58] Field of Search ............ 414/634, 635, 636, 637, 414/630, 631, 632, 628, 629, 21, 673; 187/9 R; 212/155, 156, 157, 154; 364/508; 340/815.01, 665; 177/25.11, 25.12

[56] References Cited

U.S. PATENT DOCUMENTS

| 3,853,001 | 12/1974 | Mock | 212/155 X |
| 3,893,580 | 7/1975 | Stevens | 414/631 X |
| 4,093,091 | 6/1978 | Gregg et al. | 212/155 X |
| 4,206,829 | 6/1980 | Melocik | 414/631 X |
| 4,221,530 | 9/1980 | Williams, IV et al. | 414/673 |
| 4,511,974 | 4/1985 | Nakane et al. | 414/634 X |
| 4,516,117 | 5/1985 | Couture et al. | 212/156 X |
| 4,957,408 | 9/1990 | Ohkura | 414/673 X |

FOREIGN PATENT DOCUMENTS

| 2054814 | 5/1972 | Fed. Rep. of Germany | 212/157 |
| 3203553 | 9/1988 | Fed. Rep. of Germany | |
| 8503113 | 6/1987 | Netherlands | 212/155 |
| 2031594 | 4/1980 | United Kingdom | 212/155 |
| 2037444 | 7/1980 | United Kingdom | 212/155 |

*Primary Examiner*—Frank E. Werner
*Attorney, Agent, or Firm*—Thomas R. Shaffer

[57] ABSTRACT

An industrial truck designed, for example, as a counterweight fork lift truck has a lifting stand 2, which is pivotable around a tilting axis N situated crosswise to the vehicular longitudinal axis in the front area of the vehicle in a lifting stand support. The counterweight fork lift truck is also provided with a monitoring unit for detecting and indicating the loading state, which has at least one measuring device located in the lifting stand support. The measuring device designed, for example, as a strain gauge 12, 13 picks up the vertical bearing forces and the horizontal ones parallel to the vehicular longitudinal axis, $F_V$ and $F_H$. The measuring device is connected with a data storage unit 13, which is connected to a loading state indicator 14. Both static and dynamic loads on the fork lift truck can be indicated.

9 Claims, 3 Drawing Sheets

INDUSTRIAL TRUCK WITH A MONITORING APPARATUS FOR THE LOADING STATE

BACKGROUND OF THE INVENTION

1. Field of the Invention

The invention concerns an industrial truck with a lifting stand that is swivellable around a tilting axis located outside of the wheel base in a lifting stand bearing support, at least in certain operating states, and with a monitoring device for detecting and indicating the loading state.

2. Description of the Art

Industrial trucks with a tilting axis of the lifting stand outside of the wheel base are, for example, the ordinary counterweight fork lift trucks, in which the lifting stand tilting axis is located in the front area of the vehicle crosswise to the longitudinal axis of the vehicle. In addition, the so called side fork lift trucks take up the load outside of the wheel base with a lifting stand displaceable crosswise to the direction of movement. The load is transported after the lifting stand is again drawn back completely. Fork lift reach trucks also have a displaceable lifting stand for receiving the load outside of the wheel base. For a better understanding, the following statements refer to counterweight fork lifts, but are not limited to them.

Because the load to be transported is taken up outside of the wheel base, a torque develops around the front axle in counter-weight fork lifts. A torque acting in the opposite direction is imposed by the weight of the fork lift truck itself. The torque deriving from the load is dependent on the weight of the load and on the distance of the load center from the tipping axis (front axle), which is also modified in the case of a tilting movement of the lifting stand. When an excessively large load is taken up or if the distance of the load center from the tipping axis is too great, there is the danger that the tipping limit of the fork lift is exceeded. Even if the tipping limit is not reached in the static state, the fork lift truck can tip over due to dynamic forces in the moving vehicle, e.g., centrifugal forces in rounding curves or inertial forces during braking and acceleration. There have been many attempts to prevent this or at least signal the driver in good time so that the latter can take countermeasures.

It is thus known from the DE-OS 32 03 553 to detect the loading state of the fork lift truck from the pressure in the lifting cylinder and the pressure in the tilting cylinder of the lifting stand. The loading state is displayed graphically on an indicating field within view of the driver. If there is the danger of the fork lift truck tipping due to an unfavorable load state, this is also signalled. Detection of the loading state via the hydraulic pressure has the shortcoming that due to the fastening of the lifting cylinder on the lifting stand and the resulting position change in the cylinder in the case of a tilting movement of the lifting stand, a force is measured that does not correspond in all cases to the actual weight force, but only to a force component in the acting direction of the lifting cylinder axis, which can lead to imprecision.

The present invention proposes to offer a fork lift truck of the above type, in which the danger of tipping is further reduced through an improved monitoring of the loading state.

SUMMARY OF THE INVENTION

This goal is achieved according to the invention by providing a monitoring unit means which includes at least one measuring device located in the lifting stand bearing support, which is connected with a data storage unit, which is connected to a loading state display unit. The weight force of the load can thus be determined quite precisely, independently of the tilting of the lifting stand. According to an extremely advantageous further refinement of the inventive concept, it is provided that at least two measuring devices are located in the lifting stand support along the tilting axis and spaced away from each other, which are designed to detect vertical and horizontal bearing forces parallel to the longitudinal axis of the vehicle. It is thus possible to obtain information on the magnitude of the weight force of the load and on the magnitude of the resulting load moment, i.e., information on the static loading state. On the other hand, the lateral load offset can thus be determined for the first time and included in the monitoring, which is particularly important for monitoring the dynamic loading state. Namely, only in a few cases will the loading of the fork lift truck by the load be precisely on the longitudinal center line. In general, the load is taken up by the fork arms slightly displaced laterally or, for example, is moved crosswise to the longitudinal direction of the vehicle by lateral slides integrated in the fork carrier for maneuvering purposes and is then no longer shifted into the middle position. With laterally displaced loading the danger that the fork lift truck will tip over due to centrifugal forces is thus all the greater in travel movements of the lift truck, especially in turning curves.

The inventive concept consists in the fact that at least in a vertically oriented lifting stand and with a horizontal position of the lifting stand tilting cylinder receiving the load moment and in the case of a lifting stand bearing support such that the tilting axis and the tipping axis of the fork lift truck coincide, the vertical bearing forces in the lifting stand support, which correspond to the weight of the load, and the horizontal bearing forces in the lifting stand support, which are a measure for the load moment, are involved in monitoring the loading state. In a lifting stand support in which the tilting axis does not coincide with the tipping axis and in which the tilting cylinders are not horizontal, this must be taken into account mathematically.

The sum of the vertical bearing forces detected by the measuring devices in the lifting stand support corresponds in the static loading state to the weight of the load taken up. The horizontal bearing forces in the lifting stand support parallel to the vehicular longitudinal axis are a measure for the load moment resulting from the load and which engages on the tipping axis.

The measurement data evaluated in the data storage unit also provide information on the symmetry of the load on the fork arms and the change in load moment when the lifting stand tilts, as well as on changes in the loading force and the loading moment during braking, acceleration and when the fork lift truck turns curves.

According to an advantageous embodiment of the inventive concept, it is provided in a fork lift truck in which the lifting stand support consists of two knuckle joints spaced from each other along the tilting axis, these joints being located on the lateral regions of the lifting stand and each having a bearing bolt, that each bearing bolt is provided with elongation measuring strips for receiving the vertical bearing forces and elongation measuring strips for receiving the horizontal bearing forces parallel to the longitudinal direction of the vehicle. The loading values required for monitoring the loading state can thus be detected simply and cost favorably. This can occur according to another embodiment of the invention also in that each bearing bolt is provided in the vertical and horizontal directions with receivers for electro-magnetic shear force measurements.

In the additional refinement of the invention, the loading state indicator has a display field with a two-dimensional coordinate system, in which the loading moment is provided as a variable on the abscissa and the loading force as a variable on the ordinate, where the loading state of the fork lift truck is represented by two value pairs, to which the forces acting on the two measuring devices are assigned and where a graphic symbol is indicated on the display field at the point of intersection of each value pair. The loading force is considered to be the sum of the weight of the load and of the additional inertial forces, acting vertically and arising under dynamic load, that may occur. The loading moment represents the sum of the moments arising from the weight and the inertial forces.

A graphic representation of the loading state of a fork lift truck is indeed already known in itself, but the mode of representation described here facilitates a much improved monitoring because the loads deriving from the lateral load shift are indicated in the form of two value pairs of loading force and loading movement.

For this purpose, it is favorable if the two value pairs are assigned different graphic symbols. For example, dot and circle symbols can be provided here, which represent the signals of the left and right measuring device. If the distance of the load center from the tipping axis increases at constant load, the symbols on the display field move to the right in the horizontal direction. On the other hand, if the load increases with a constant distance to the tipping axis, the symbols move diagonally to the right and upward. In turning curves, centrifugal forces act on the load and thus on the lifting stand and the lifting stand support. The symbols will thus move away from each other and assume a certain distance from each other depending on the magnitude of the centrifugal force. The magnitude of the spacing can be used as a measure of the lateral tipping security of the fork lift truck.

If the load is received precisely in the middle of the lifting stand, the symbols overlap in the static loading state. In this state it is provided according to one embodiment that with value pairs of similar coverage a third graphic symbol different from the two symbols is shown in the coverage point on the display field instead of the two different graphic symbols.

To be able to detect the degree of loading, it is advantageous if in the coordinate system boundary lines are indicated for the admissible loading force and for the admissible loading moment. Thus, upper limit safety values for the loading force and the loading moment are provided. If the symbols move within a frame that is formed by the upper boundary line (loading force), the right hand limitation (loading moment), the abscissa and the ordinate, the vehicle is tipping-stable, at least in the forward direction. If the symbols go beyond the upper limitation, the loading force is too large. If the symbols go beyond the right hand limitation, the loading moment is too large.

In a further refinement of this measure, it is proposed that the monitoring device have a measuring device for detecting the lifting height of the load, which is connected to the loading state indicator, and that the boundary lines in the coordinate system are variable on the display field as a function of the lifting height. The vehicle-specific boundary zone of the loading state can thus be established by including the lifting height.

To increase the safety of the fork lift truck according to the invention even further, it is provided that the data storage unit be connected with the drive system of the fork lift truck and when prescribed boundary values of the loading force and/or loading moment are exceeded, the drive system is influenced in the direction of dropping below the boundary values. The possibility of automatic intervention in the driving, lifting and tilting mechanisms of the fork lift truck is thus offered. In side fork lift trucks and reach fork lift trucks the travel of the lifting stand out from the wheel base can thus be stopped or the lifting stand can be drawn in further.

It has also proved expedient to place the data storage unit in working connection with the drive system and to influence the drive system toward dropping below the difference when a prescribed difference between the loadings of the two measuring devices is exceeded. In this manner, the fork lift truck can be slowed down or stopped when a prescribed lateral tipping stability is not attained. This is true also when travelling empty, so that a tipping over of the empty lift truck is prevented while turning curves.

If a registration unit is connected to the data storage unit, the invention fork lift truck can be used as a load-weighing unit.

Additional advantages and details of the invention will be described in greater detail in an exemplary embodiment with reference to the schematic figures.

DETAILED DESCRIPTION OF THE PREFERRED EMBODIMENT

A load 3 lies on the fork arms 1 of a lifting stand 2 of a counterweight fork lift truck. The lifting stand 2 is pivottably supported around a tilting axis N in a lifting stand bearing support and is connected with the vehicle frame (not shown) of the fork lift truck. A hydraulic tilting cylinder 4 is also articulated on the lifting stand 2 in order to effect the swinging movement. The vertical weight force $F_Q$ originating from the load 3 engages at the load center at a distance a from the tilting axis N and produces a load moment. A vertical reaction force (bearing force) $F_V$ in the lifting stand support is of the same magnitude and oppositely oriented. A reaction moment, which derives from a force $F_N$ of the tilting cylinder and engages at a distance b from the tilting axis N, acts against the load moment. A horizontal reaction force (bearing force) $F_H$ in the lifting stand support, parallel to the vehicular longitudinal axis, of the same magnitude and opposite to the tilting cylinder force $F_N$, handles compensation of the forces. The vertical reaction force $F_V$ corresponds to the weight $F_Q$ of the load 3 taken up. The horizontal reaction force $F_H$ is a measure for the load moment produced by the load 3. This is true only for purely static loading. With dynamic loading, namely, during acceleration and braking of the vehicle, the moment around the tilting axis and thus the reaction force $F_H$ are modified due to the force of mass reactance of the load 3. It is self-evident that even the weight of the empty lifting stand of the lifting stand support creates reaction forces, which are to be compensated in the measuremental detection of the bearing forces, at least with purely static loading, by nullification, such that only forces going beyond this are relevant.

The load center distance a is variable and is a function of the type load 3 and also the position of the load 3 on the fork arms 1 as well as on the tilting of the lifting stand 2.

Figure 1:
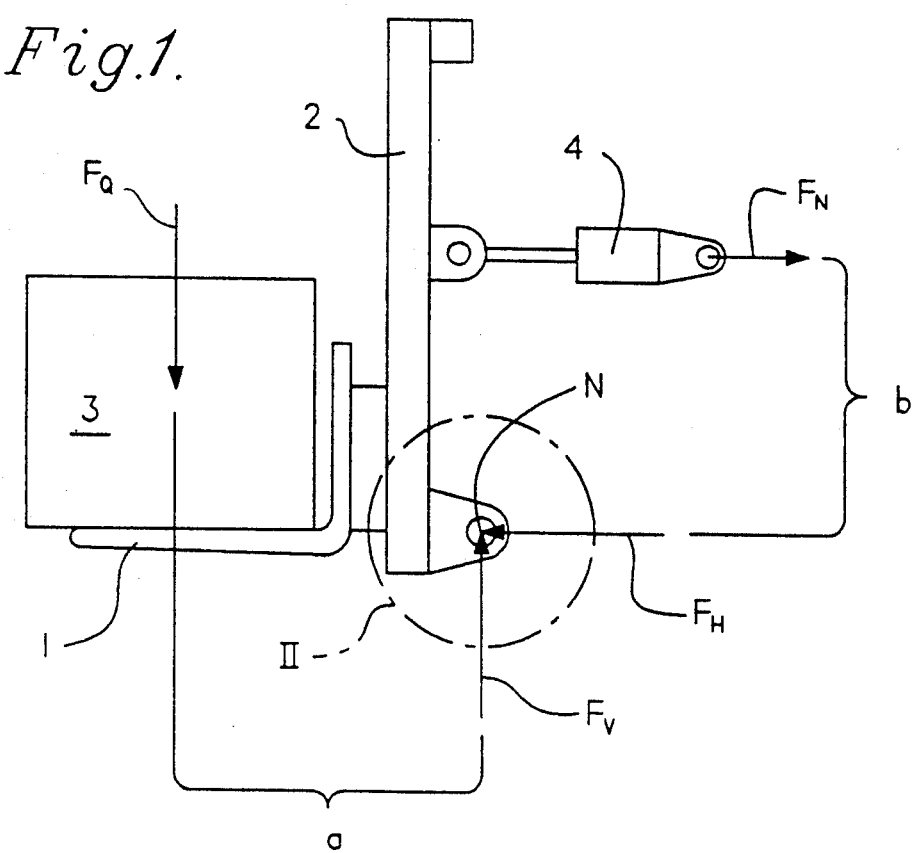
FIG. 1 shows the force relationships in a lifting stand.

The lateral position of the load 3 on the fork arms 1 is variable also (i.e., variable in FIG. 1 into the drawing plane or out of the drawing plane). In the ideal case, the load center lies in the middle between the two fork arms.

Figure 2:
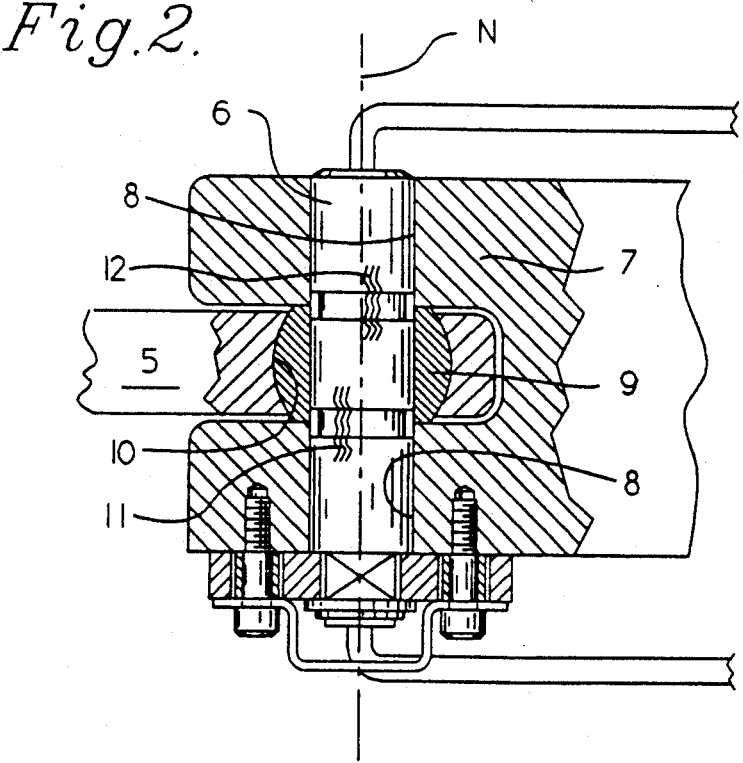
FIG. 2 shows a knuckle joint between the lifting stand and the fork lift truck, in horizontal section.
Figure 5:
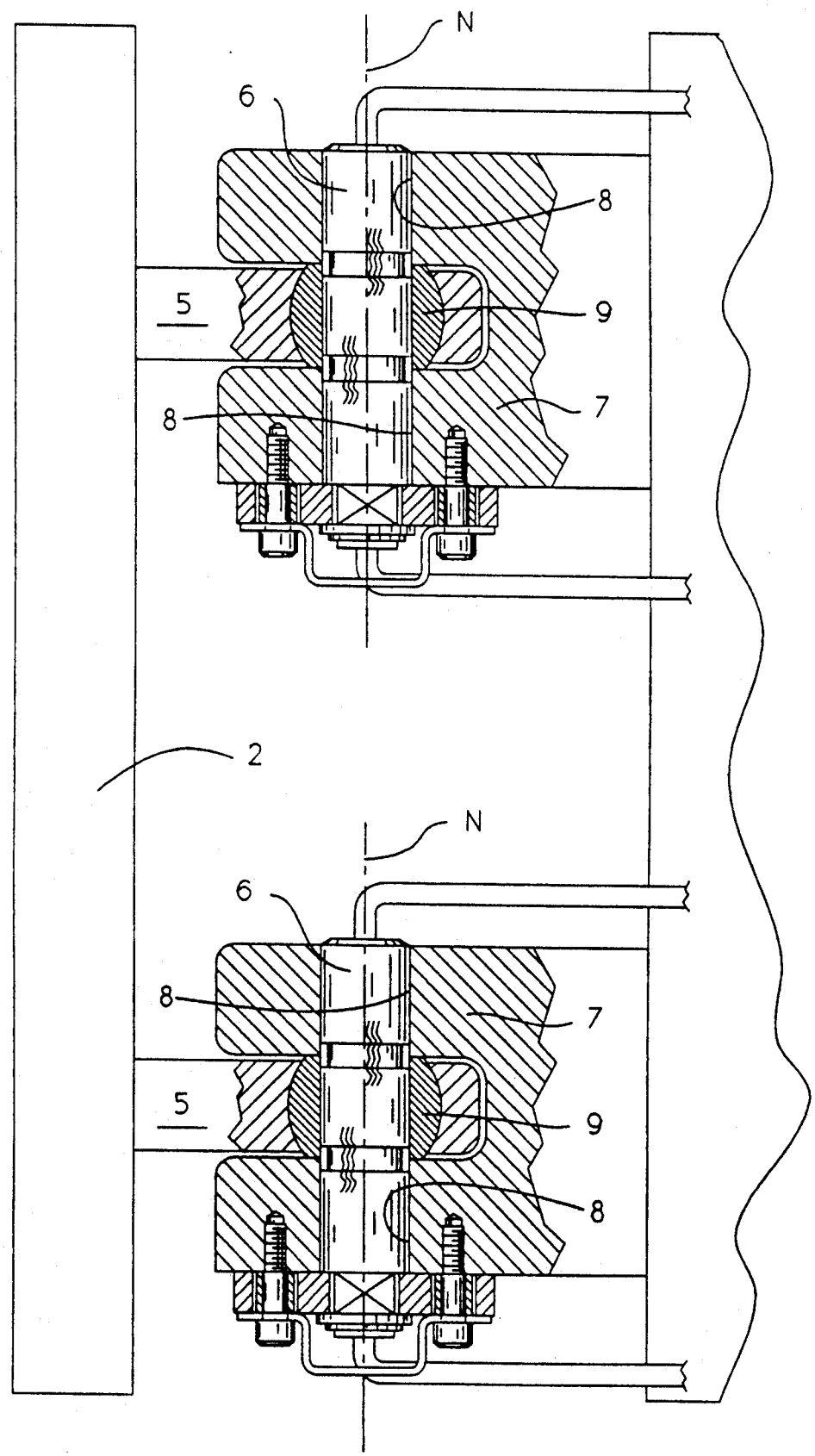
FIG. 5 shows measuring devices utilized in the preferred embodiment in the form of a left hand knuckle joint and a right hand knuckle joint in horizontal section.

Lifting stands are usually connected to the fork lift truck through right and left knuckle joints. Such a knuckle joint is shown in FIG. 2 and a left and right knuckle joint shown in spaced relationship mounted at lateral areas of the lifting stand are shown in FIG. 5. An outrigger component 5 of the lifting stand 2 is connected here by means of a bearing bolt 6 with a U-shaped receiving part 7 of the vehicle frame of the fork lift truck. Expediently, the bearing bolt 6 is fastened nontorsionally in the receiving holes 8 of the receiving part 7. In the middle range of the bearing bolt 6 it is nontorsionally connected with a spherical sleeve 9, which is supported in a hole 10 of the outrigger component 5 of the lifting stand 2. The relative movement between lifting stand and the vehicle frame during the tilting of the former thus occurs between the spherical sleeve 9 and the hole 10 of the outrigger part 5. The lifting stand support thus designed and consisting of two of the described knuckle joints absorbs the reaction forces $F_V$ and $F_H$. Because two knuckle joints are provided, a distribution of the reaction forces as a function of the lateral load shift takes place. There are also different loadings of the knuckle joints in turning curves due to centrifugal forces. The reaction force $F_H$ also varies due to inertial forces during the acceleration and braking of the fork lift truck. Each knuckle joint is provided with a measuring device for detecting the loading state. The measuring devices consist in this example of elongation measuring strips or strain gauges. Strain gauges 11 are provided, for example for detecting the horizontal reaction forces $F_H$ parallel to the longitudinal direction of the vehicle and strain gauges 12 for detecting the vertical reaction forces $F_V$. The strain gauges 11 and 12 generate signals U proportional to the reaction forces $F_V$ and $F_H$. The reaction forces $F_V$ and $F_H$ can also be determined by magneto-elastic shear force measurement.

Figure 3:
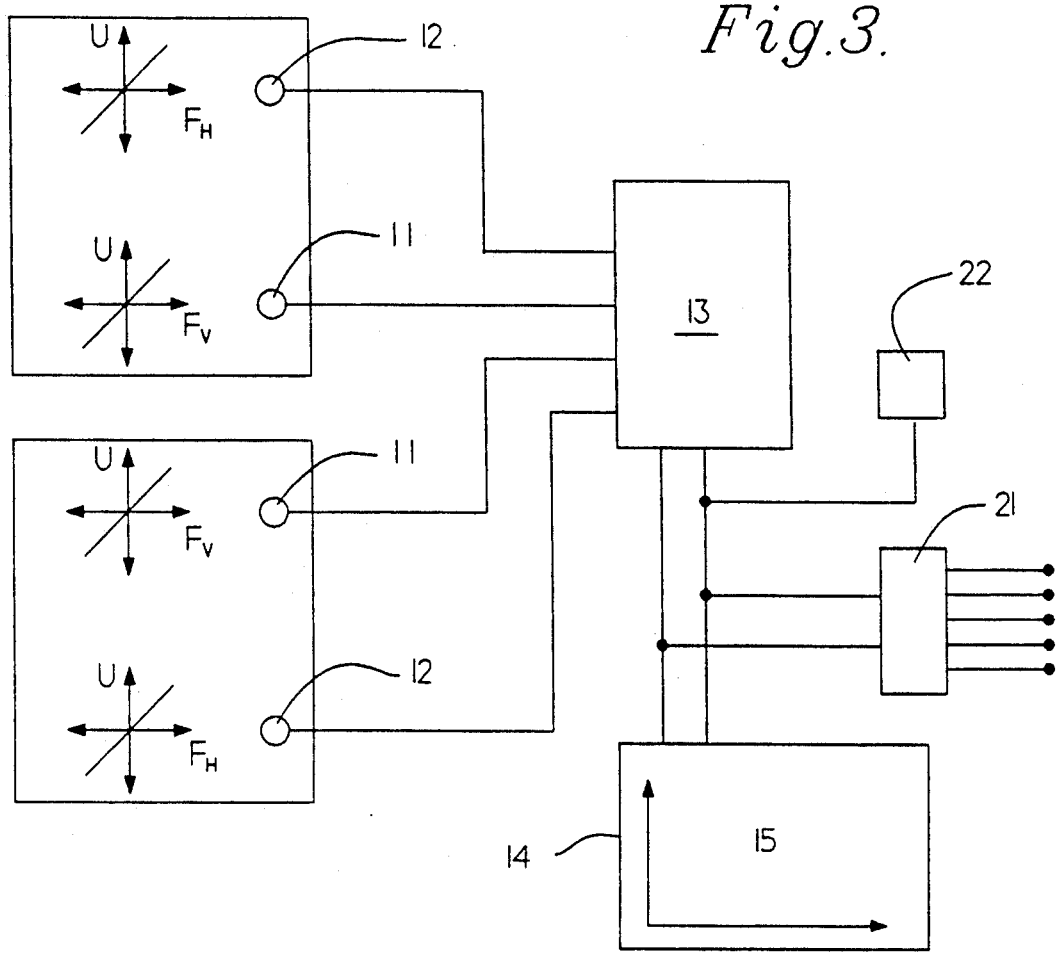
FIG. 3 shows a block diagram of the monitoring unit means.
Figure 4:
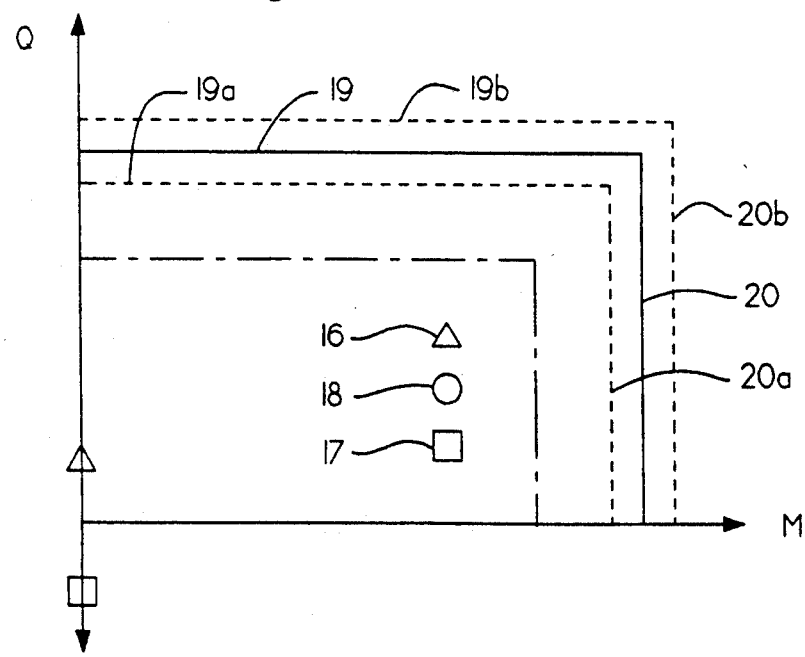
FIG. 4 shows the coordinate system represented on the display field of the monitoring unit.

As is evident from FIG. 3, the signals generated by the strain gauges 11 and 12 are passed on to the data storage unit 13, which is connected to a loading state indicator 14. The loading state indicator 14 has a display field 15, which is located if possible in the vision field of the operator.

A two dimensional coordinate system is presented on the display field 15. The loading moment M is provided as a variable on the abscissa and the loading force Q on the ordinate. The value pair $F_V/F_H$ furnished by the strain gauges 11 and 12 of the measuring device of each knuckle joint is indicated graphically in the coordinate system as the value pair loading moment M/loading force Q. For this purpose, a specific graphic symbol is used in the point of intersection of each of the two value pairs, e.g., a triangle 16 for the left-hand knuckle joint and a square 17 for the right-hand knuckle joint. If the load is taken up precisely in the middle between the two fork arms 1, the symbols overlap. A common symbol, e.g., a circle 18, can then be indicated. If the distance a of the load center from the tilting axis N increases with constant load, the symbols 16 and 17 (or 18) move to the right (increase in the loading moment). An increase in the weight of the load with constant distance a results in a diagonal movement to the right and upward because the loading moment also increases. In the coordinate system a boundary line 19 is indicated for the admissible rated loading force and a boundary line 20 for the admissible rated loading moment. If the symbols 16 and 17 or 18 move within the range determined by the abscissa and the ordinate and the boundary lines 19 and 20, the fork lift truck is tipping-stable. The boundary lines are preferably variable as a function of the lifting height of the load. The lifting height can be determined, for example, by measuring the oil level in the container that supplies the lifting cylinder with oil. It is advantageous if the operator is warned also optically or acoustically before the boundary line is reached. Superposed boundary lines 19a and 20a are provided for this purpose; appropriate warning signals are emitted when they are reached or exceeded. If the admissible loading force or the admissible loading moment is exceeded by a certain amount, which can be monitored by the additional boundary lines 19b and 20b, it is provided that intervention in the drive system of the fork lift truck takes place toward dropping below the boundary values. For this purpose, a check instrument 21 is connected to the data storage unit 13; it is connected, for example, with the steering and braking system, the propelling equipment and the lifting and tilting units.

As stated, two graphic symbols 16 and 17 are indicated in the coordinate system in the case of a sideways load shift. The distance between the symbols represents a measure for the tipping loading in turning curves. It is expedient to prescribe an admissible spread, at the exceeding of which warning signals are emitted or measures for guaranteeing the tipping stability are instituted. In turning a corner without a load, the graphic symbols 16 and 17 move away or toward each other on the ordinate. A maximum spread is also provided here to prevent the fork lift truck from tipping over.

Due to the vibrations and jerks occurring during travel, it is necessary to provide the monitoring unit with adequate damping. It is also possible to omit an indication of the value pairs during travel and allow only the optical or acoustic warning signals and interventions in the drive system.

A registration unit 22 is connected to the data storage unit 13, data on the loads transported by the fork lift truck can be stored with their aid.

While certain presently preferred embodiments of the present invention have been described and illustrated, it is to be distinctly understood that the invention is not limited thereto but may be otherwise embodied and practiced within the scope of the following claims.

We claim:

1. Industrial truck comprising:
   a drive system;
   a lifting stand support attached to said industrial truck;
   a lifting stand pivotally mounted on said lifting stand support whereby said lifting stand is pivotable around a tilting axis in said lifting stand support in at least certain operating states; and
   monitoring unit means for detecting and indicating a loading state of said lifting stand, said monitoring unit means having at least two measuring devices located in the lifting stand support for detecting vertical bearing forces and horizontal bearing forces, said measuring devices comprising two knuckle joints spaced apart from each other along said tilting axis and located at lateral areas of the lifting stand, each said knuckle joint having a bearing bolt, and each bearing bolt (6) being provided with strain gauges (12) for detecting the vertical bearing forces and strain gauges (11) for detecting the horizontal bearing forces parallel to a longitudinal axis of said industrial truck, said monitoring unit means also having a data storage unit (13) connected to said measuring devices, and a loading state indicating unit (14) connected to said data storage unit.

2. Industrial truck according to claim 1, wherein each bearing bolt is provided with receivers for magnetoelastic shear force measurements in vertical and horizontal directions.

3. Industrial truck according to claim 1, wherein the loading state indicating unit (14) has a display field (15) with a two-dimensional coordinate system having an abscissa and an ordinate, in which a loading moment, consisting of a sum of moments arising from weight and dynamic inertial forces of a load provided on said lifting stand, is displayed as a variable on the abscissa and a loading force, consisting of a sum of the weight and additional dynamic vertical inertial forces caused by a load provided on said lifting stand, is displayed as a variable on the ordinate whereby the loading state of the fork lift truck is represented by two value pairs which correspond to the forces acting on the two measuring devices and wherein a graphic symbol for the value pairs is displayed on the display field.

4. Industrial truck according to claim 3, wherein different graphic symbols (16, 17) are assigned to the two value pairs.

5. Industrial truck according to claim 4, wherein a third graphic symbol (18) different from the two symbols is displayed on the display field (15) instead of the two different graphic symbols (16, 17) when the two value pairs have a same value and would otherwise overlap and be displayed at a same location on the display field.

6. Industrial truck according to claim 3, wherein boundary lines are displayed on the display field which represent upper limit safety values for the loading force (19) and for the loading moment (20).

7. Industrial truck according to claim 6, wherein said lifting stand may be lowered to a desired lifting height and wherein the monitoring unit means has a measuring device for detecting the lifting height of the load, which is connected to the loading state indicator (14), and that the boundary lines (19, 20) are variable in the coordinate system on the display field (15) as a function of the lifting height.

8. Industrial truck according to claim 1, wherein the data storage unit (13) is in working connection with the drive system of the industrial truck whereby the drive system of said industrial truck automatically effectuates a reduction in at least one of a loading force and a loading moment whenever upper limit safety values for at least one of value pairs are exceeded.

9. Industrial truck according to claim 1, wherein the data storage unit (13) is in working connection with the drive system of said industrial truck and when a prescribed difference between the bearing forces detected by the two measuring devices is exceeded, the drive system is influenced toward reducing the difference.

* * * * *

UNITED STATES PATENT AND TRADEMARK OFFICE
CERTIFICATE OF CORRECTION

PATENT NO. : 5,224,815
DATED : July 6, 1993
INVENTOR(S) : Theodor Abels, et al.

It is certified that error appears in the above-identified patent and that said Letters Patent is hereby corrected as shown below:

Column 7, line 36, after "loading state" delete "indicating unit" and insert --indicator--.

Column 8, line 15, change "a" to --the--.

Column 8, line 33, after "one of" delete "a" and insert --the--.

Column 8, line 33, after "and" delete "a" and insert --the--.

Column 8, line 34, after "whenever" insert --said--.

Column 8, line 35, after "of" insert --said--.

Signed and Sealed this

Thirteenth Day of September, 1994

Attest:

Attesting Officer

BRUCE LEHMAN

*Commissioner of Patents and Trademarks*